Dec. 13, 1949     M. H. ROWE     2,491,281
METHOD OF MAKING VULCANIZING PATCHES
Filed March 4, 1947     2 Sheets-Sheet 1
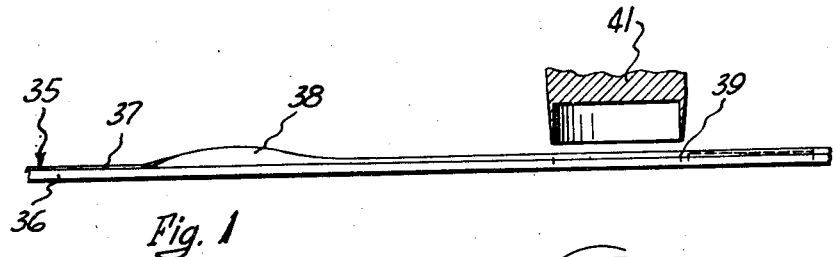
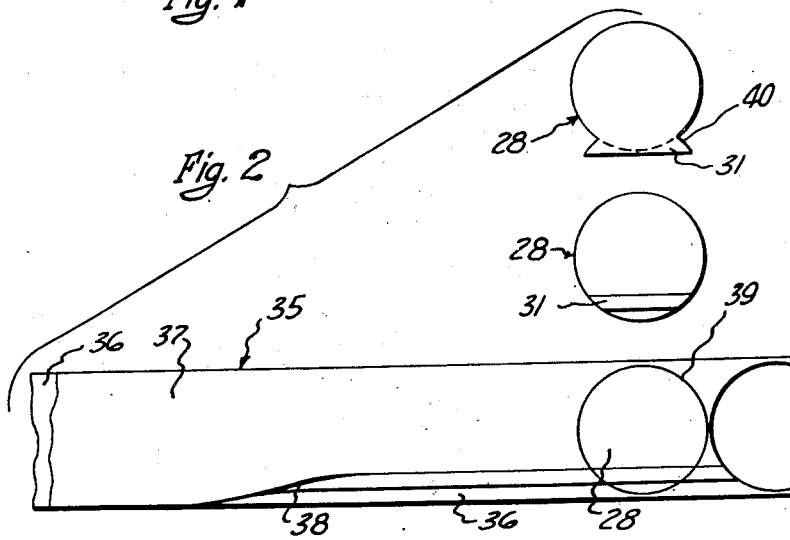
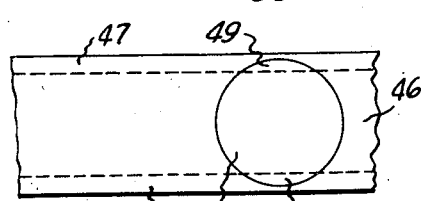
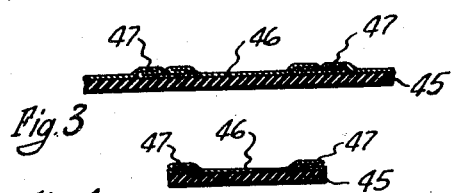
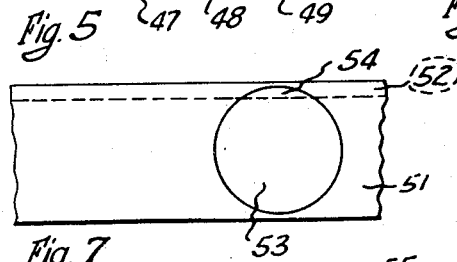
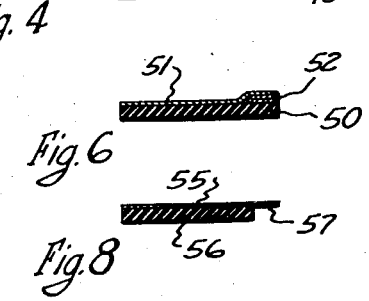
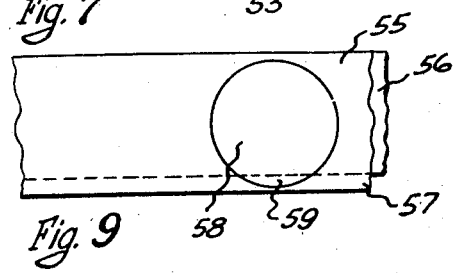
MARION H. ROWE
      INVENTOR.
BY *Hastings Ackley*
        ATTORNEY Dec. 13, 1949 M. H. ROWE 2,491,281
METHOD OF MAKING VULCANIZING PATCHES
Filed March 4, 1947 2 Sheets-Sheet 2
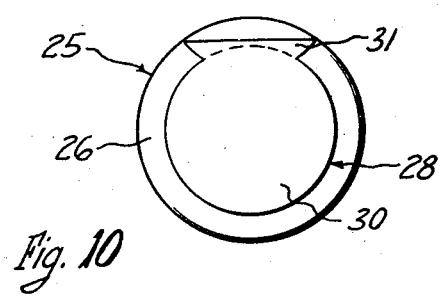
Fig. 10
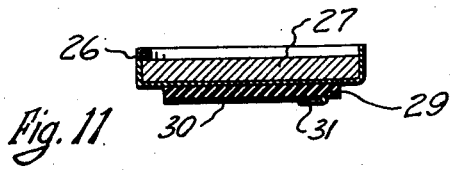
Fig. 11
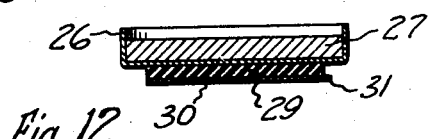
Fig. 12
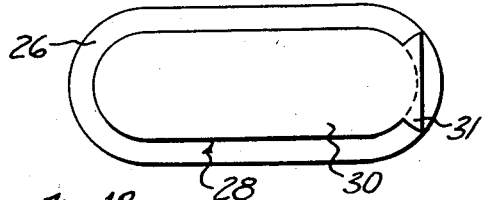
Fig. 13
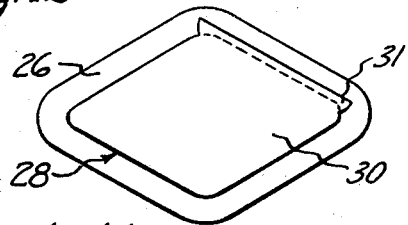
Fig. 14
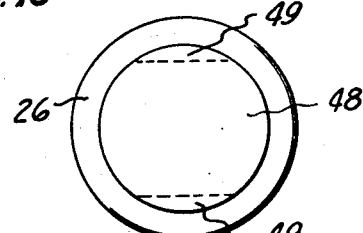
Fig. 15
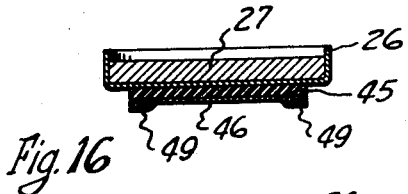
Fig. 16
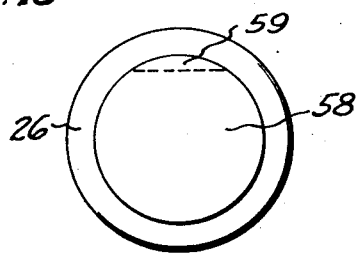
Fig. 19
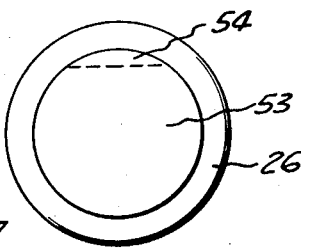
Fig. 17
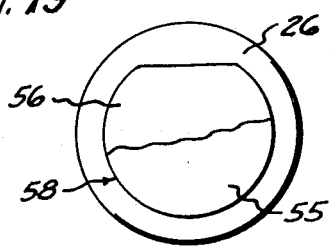
Fig. 20
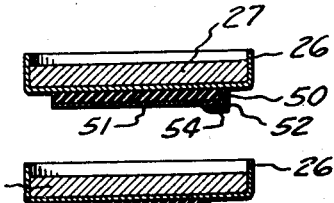
Fig. 18
Fig. 21
Marion H. Rowe
INVENTOR.
BY
ATTORNEY Patented Dec. 13, 1949

2,491,281

UNITED STATES PATENT OFFICE 2,491,281

METHOD OF MAKING VULCANIZING PATCHES

Marion H. Rowe, Dallas, Tex.

Application March 4, 1947, Serial No. 732,190

10 Claims. (Cl. 154—125)

This invention relates to new and useful improvements in vulcanizing patches and methods of making the same.

It has been common practice for many years to repair punctures or breaks in inner tubes or other rubber articles by vulcanizing a patch of rubber to the article to completely cover and close the break or puncture. One of the more common means for accomplishing this result consists of individual self-contained vulcanizing units, having a combination pressure plate and fuel container with a fuel element therein and a patch of unvulcanized gum rubber or other similar material attached or adhering to the under side of the pressure plate. The unvulcanized gum rubber or other material commonly has a protective covering, usually of Holland cloth or similar material, which is pressed upon and tightly adheres to the exposed surface of the gum material and which prevents contamination and deterioration of the exposed surface of such unvulcanized gum material. This protective covering has heretofore been cut to the same shape and dimensions as the patch of unvulcanized rubber or other material, and has therefore been difficult to remove when the patch is to be used. It has been necessary to insert some object between the protective covering and the unvulcanized patch material to lift the protective covering from such patch material, whereby the unvulcanized material is exposed and may be placed directly upon the article to be repaired, and vulcanized thereto. Such removal has usually been accomplished by inserting a knife blade, a fingernail, or the like, between the unvulcanized gum material and the Holland or protective covering and then peeling the covering from the gum patch material; and is even then a slow and difficult process. In the absence of an article to be inserted for lifting the protective covering, it was extremely difficult to uncover the unvulcanized material without damaging it.

It is, therefore, a particular object of this invention to provide an improved vulcanizing patch wherein the protective covering adhering to the unvulcanized gum material is provided with a tab to facilitate removal of such protective covering from the gum vulcanizing material and wherein the protective covering may be removed without damaging such unvulcanized gum material.

Another object of the invention is to provide an improved vulcanizing patch wherein the protective covering for the gum material is provided with a marginal portion which does not adhere to the gum material, thus providing a tab facilitating removal of such protective covering for the gum material.

A further object of the invention is to provide an improved vulcanizing patch of the character described wherein the protective covering for the gum vulcanizing material is provided with an integral tab extending beyond the edge of the gum vulcanizing material, whereby the tab may readily be grasped and lifted to remove the protective coating from the gum vulcanizing material.

A still further object of the invention is to provide a vulcanizing patch, of the character described, wherein the tab is formed of material which would otherwise normally be wasted in the manufacture of the patch.

Still another object of the invention is to provide in an improved vulcanizing patch of the character described a protective covering having a plurality of layers at a marginal portion of the patch, whereby at least one layer does not adhere to the gum material of the patch and thus provides a tab which may readily be grasped to facilitate removal of the protective covering from the gum material.

It is an important object of the invention to provide an improved method for manufacturing vulcanizing patches, of the character described, which includes infolding a marginal portion of the protective covering material, and cutting out the patch in such a manner that an infolded marginal portion of the protective covering is within the marginal outline of the patch, whereby the infolded marginal portion of the protective covering provides a tab by means of which the protective covering may be lifted from the gum vulcanizing material.

A most important object of the invention is to provide an improved method for manufacturing vulcanizing patches from gum vulcanizing material having a single layer of protective covering material, which includes infolding a marginal portion of the protective covering material over the main portion thereof, and cutting out a patch in such a manner that the infolded marginal portion of the protective covering is within the marginal outline of the patch, whereby the infolded marginal portion of the protective covering may be unfolded to provide an integral tab extending beyond the marginal edge of the unvulcanized gum vulcanizing material.

A still further object of the invention is to provide an improved method for manufacturing vulcanizing patches, of the character set forth herein, which is adapted to automatic machine operations.

Still another object of the invention is to provide a patch of the character described which may readily be manufactured from materials already in common use, and in automatic machines already in use, whereby the patch may be produced in great quantities and without additional material cost.

Additional objects and advantages of the invention will readily be apparent from a reading of the following description of vulcanizing patches constructed in accordance with the invention and the methods of making the same, and reference to the accompanying drawings illustrating the same, wherein:

Figure 1 is a schematic view, in side elevation, illustrating the steps of the preferred method of making the improved vulcanizing patches, Figure 2 is a schematic plan view further illustrating the steps of the preferred method of manufacturing the patch, Figure 3 is a transverse vertical sectional view of a body of patch material, having the protective covering applied in a modified form, prior to cutting the body into elongate strips, Figure 4 is a transverse vertical sectional view of a single strip of patch material cut from the body illustrated in Figure 3, Figure 5 is a plan view of the strip of material of Figure 4 showing the manner in which the patch shape is cut from the strip to provide tabs on the patch, Figure 6 is a transverse vertical sectional view of a strip of patch material having a further modified form of protective covering material, Figure 7 is a plan view of the strip of Figure 6 showing the manner in which the patch shape is cut therefrom, Figure 8 is a transverse vertical sectional view of a strip of patch material having a still further modified form of protective covering, Figure 9 is a plan view of the strip of Figure 8 illustrating the manner in which a patch shape is cut from the strip to provide a tab on the patch, Figure 10 is a plan view of the under side of a vulcanizing element having one form of a patch formed in accordance with the invention provided thereon, Figure 11 is a transverse vertical sectional view of the vulcanizing element of Figure 10, showing the tab in folded position, Figure 12 is a view similar to Figure 11 showing the tab unfolded, Figures 13 and 14 are plan views of vulcanizing elements of different shapes, showing vulcanizing patches of different shapes having tabs of the same form as the tab of Figure 10 provided thereon, Figure 15 is a plan view of a vulcanizing element having a modified form of the vulcanizing patch thereon, Figure 16 is a transverse vertical sectional view of the vulcanizing element and patch of Figure 15, Figure 17 is a plan view of a vulcanizing element having a further modified form of the vulcanizing patch thereon, Figure 18 is a transverse vertical sectional view of the vulcanizing element and patch of Figure 17, Figure 19 is a plan view of a vulcanizing element having a still further modification of the vulcanizing patch thereon, Figure 20 is a view, similar to Figure 19, having a portion of the protective covering cut away to show the shape of the gum vulcanizing material, and Figure 21 is a transverse vertical sectional view of the vulcanizing element and patch of Figure 19.

In the drawings, Figures 10 through 14, the numeral 25 designates a vulcanizing unit of the individual self-contained type, which includes the usual thin, sheet-metallic fuel pan and pressure plate 26 having the customary combustible fuel element 27 contained therein and with a patch 28 of unvulcanized gum rubber or other similar vulcanizing material 29 adhering to the under side of the fuel pan. A protective covering 30, preferably of Holland cloth or similar material, is pressed upon and adheres to the under side of the gum vulcanizing material 29 in the usual manner for protecting such material against contamination, deterioration and the like.

The protective covering or Holland 30 is formed with an integral tab 31 which preferably projects outwardly beyond the marginal edge of the patch of gum vulcanizing material 29 covered thereby. The projecting tab 31 thus permits the user of the vulcanizing unit to grasp the tab between the fingers and lift the same to peel the protective covering or Holland 30 from the patch of vulcanizing material, when it is desired to use the vulcanizing unit to repair a break or puncture in an inner tube or other rubber article.

The tab on the protective covering material may be provided on patches of various sizes and shapes. A round patch is illustrated in Figure 10, an elongated patch is illustrated in Figure 13, and a substantially diamond-shaped patch is illustrated in Figure 14. While the shapes of the several patches illustrated are different, the elements of this form of the patch are the same and are given the same identifying numerals.

The formation of the tab on the protective cover has presented definite problems, because the gum material is difficult to handle if there is no protective cover. Furthermore, the vulcanizing material is customarily manufactured and supplied in long strips having a single layer of Holland or other protective cover material pressed upon and adhering to one surface. The long strip is usually wound upon itself into handy rolls from which it may be unwound as used. As a result, the usual form of the material from which the patches are cut does not lend itself readily to the cutting or shaping of the gum material and cover independently of each other and then assembling the separately formed pieces to provide a patch having an integral tab on the cover.

Therefore, while the vulcanizing patch having an integral tab of protective covering material projecting beyond the marginal edge of the gum vulcanizing material may be formed in different manners, the following described method is preferable. An elongate strip 35 of gum vulcanizing material 36, having a protective cover 37 of Holland cloth or similar material pressed upon and adhering to one side thereof, is processed by first lifting a relatively narrow marginal portion of the protective covering material and folding the same inwardly over itself, as illustrated at 38, leaving a marginal portion of the vulcanizing material uncovered. The strip having the infolded protective cover is then die-cut, stamped or otherwise severed, as illustrated at 39, to form the patch 28 of gum vulcanizing material 29 having a protective cover 30 with an infolded tab 31. The patch is cut from the strip in such a manner that the folded portion of the protective cover or Holland lies within the marginal edges of the patch, as clearly shown in Figure 2. The severed patch 28 is then moved under a drag member (not shown) which unfolds the tab 31, as shown at 40, to completely recover the gum vulcanizing material and provide the projecting tab 31.

Obviously, the vulcanizing patch may be punched through a die, as it is severed from the strip 35, and pressed against the under side of a fuel pan 26, whereupon the fuel pan having the patch adhering thereto may be passed under the drag member to unfold the protective cover tab 31 in the manner just described.

Also, while it is preferable that the protective covering be unfolded to completely recover the gum vulcanizing material, it is obvious that such step is not absolutely essential, and that the infolded tab or protective material may be left in the position illustrated in Figure 11, if desired. In such event, a small portion of the gum vulcanizing material is left unprotected and may become contaminated or deteriorate rapidly. Since this is an undesirable condition, however, it is preferable that the protective covering be unfolded to completely recover the gum vulcanizing material.

It will readily be seen that this preperred method lends itself readily to automatic machine processing. The elongate continuous strip 35 may be fed continuously into a machine having a tucker or folder for automatically lifting and folding the marginal portion of the protective cover inwardly over itself, as illustrated at 38 in Figures 1 and 2; the strip having the infolded marginal portion of protective covering being then fed beneath a cutting die or other severing device 41 for cutting successive patches from the strip. The severed patch may then be fed beneath a drag member for unfolding the infolded tab of protective covering as shown at 40, in the manner already described.

The foregoing method of making a patch provides for the formation of a tab on the protective cover material from a portion of such material which would otherwise constitute waste or scrap, and it will particularly be noted that the patch having the tab formed integral with the protective cover may readily be manufactured from materials already in common use and in automatic machines already in use, whereby the patch may be produced in great quantities and without additional material costs.

Manifestly, a patch of gum material having a protective covering provided with a tab for lifting said covering from the gum material may be manufactured in other ways than that just described.

For one modification of the method of manufacturing the patch, illustrated in Figures 3 through 5, a body of gum vulcanizing material 45 has a modified form of protective covering material 46 applied thereto. A continuous sheet of Holand cloth or other protective covering material 46 has a plurality of spaced parallel pleats 47 formed therein with the opening between the infolded portions placed on the exposed side of said covering material. The body of material is then divided into elongate strips, each one such as is shown in Figure 4, by cutting through the protective covering and gum material along the opening between the infolded portions of the pleats. This forms a strip of patch material having a protective covering with an integral flap along each marginal edge formed of a plurality of layers of protective covering material. A vulvanizing patch 48 of the desired shape may then be cut from the elongate strip in the manner indicated in Figure 5, wherein a portion of the marginal folds of covering material is included within the marginal edges of the patch. The pleated portion 47 of the protective covering material does not adhere to the gum vulcanizing material 45 and, therefore, forms a multiple ply tab 49 at opposite sides of the patch which may be grasped and lifted to remove the protective covering from the vulcanizing material, to permit use of such vulcanizing material in the customary manner. The tab formed by this method does not project beyond the marginal edges of the patch of vulcanizing material.

A vulcanizing element having a patch formed by the foregoing method is illustrated in Figures 15 and 16, wherein the patch 48 is applied to the under side of the fuel pan and pressure plate 26 having a fuel element 27 therein. The tabs 49 formed by the pleated sections 47 are readily accessible for removing the protective covering from the vulcanizing material.

A strip of patch material formed of gum vulcanizing material 50 and having a further modified protective covering 51 thereon is illustrated in Figures 6 and 7. A thin strip 52 of protective covering material is folded upon itself along its longitudinal median line, and is interposed between the protective material 51 and the gum vulcanizing material 50, along one marginal edge thereof, with its fold spaced inwardly from the edge of the patch material. The upper fold of the inserted strip and that portion of the protective covering 51 overlying it do not adhere to the gum vulcanizing material and form a longitudinal multiple ply marginal tab on the strip of patch material. A patch 53 of the desired shape may be cut from the strip of patch material in the manner illustrated in Figure 7, with a portion of the folded multiple ply protective covering lying within the marginal edges of the patch shape. This patch is similar in form to that illustrated in Figures 3 to 5, but has only one tab provided thereon.

A vulcanizing element having a patch formed from the patch material just described is shown in Figures 17 and 18, wherein the patch 53 is shown adhering to the under side of a fuel pan 26 having a fuel element 27 therein. The tab 54, formed by the multiple plies of the inserted strip and the protective covering material, does not project beyond the marginal edges of the gum vulcanizing material, but may readily be grasped to peel the protective covering material from the vulcanizing material.

A still further modified form of vulcanizing patch material strip is illustrated in Figures 8 and 9, wherein a single layer of Holland cloth or other suitable protective covering material 55 is shown adhering to one surface of a strip of gum vulcanizing material 56. The width of the protective covering material 55 is greater than the width of the gum vulcanizing material, whereby a marginal portion 57 of the protective covering material projects beyond one edge of the gum vulcanizing material. A patch 58 of the desired shape may be cut from the strip in the manner illustrated in Figure 9, the marginal edge of the patch shape encompassing a portion of the projecting marginal portion 57 of the protective covering material and extending beyond the edge of the gum vulcanizing material, whereby a projecting integral tab 59 of covering material is formed on said patch.

A vulcanizing element having a patch of the character formed by the foregoing method is illustrated in Figures 19, 20 and 21, wherein the patch 58 is applied to the under side of a fuel pan and pressure plate 26 having a fuel element 27 therein. Manifestly, the projecting tab 59 may readily be grasped to peel the protective covering material 55 from the gum vulcanizing material of the patch.

The strip material from which the vulcanizing patches are cut, in all the forms just described, may be fabricated at any time prior to cutting the patch therefrom.

It is particularly pointed out that the patch material of rubber or the like may be either uncured, such as is used in vulcanizing patches of the character already described, or the patch material may be of the partially cured type used in "cold patches" which are applied in the well known manner with cement and pressure only. For the partially cured "cold patches" the protective covering, having any one of the forms of the tabs already described, adheres to the uncured side of the material, and the tabs may be formed by any of the methods already described.

It is believed to be readily apparent that the patch material strips, whether of uncured or partially cured rubber or like material, are all adapted for use in automatic machine operations, whereby the patches, having the tabs provided thereon for facilitating removal of the protective covering, may be produced in great quantities.

From the foregoing, it will be seen that an improved vulcanizing patch has been provided having a protective covering adhering to the unvulcanized gum material and wherein the protective covering is provided with a tab for facilitating removal of such protective covering from the gum vulcanizing material, such removal being effected without damaging such unvulcanized gum material. It will also be seen that the tab may be formed as an integral part of a single layer of protective covering material, as preferred, or may be formed by a plurality of overlapping layers of protective covering material.

Furthermore, it will especially be noted that an improved preferred method for manufacturing vulcanizing patches has been disclosed which includes folding a marginal portion of a single layer protective covering material for a body of unvulcanized gum vulcanizing material and cutting out the patch in such a manner that the folded marginal portion of the protective covering is within the marginal outline of the patch, whereby an integral tab of the protective covering material is provided and may be unfolded to completely recover the unvulcanized gum vulcanizing material of the patch and extend beyond the marginal edge of such vulcanizing material to provide a tab which may be grasped readily and lifted to remove the protective coating from the vulcanizing material when the same is to be used. It will also be noted that the method of manufacturing such vulcanizing patches is particularly adapted for automatic machine processing operations; and that the patch may readily be manufactured from materials already in common use, the tab being formed of a portion of the material which would otherwise be normally wasted in the manufacture of the patch, whereby the patch may be produced in great quantities and without additional or increased material cost. It is also believed manifest that the method of manufacturing the patches may include providing a plurality of layers or folds of protective covering material along the marginal portion of a strip of patch material and cutting a patch from such material in such a manner that a portion of the multiple plies of covering material is encompassed within the patch shape to provide tabs for facilitating removal of the covering material from the gum vulcanizing material of the patch.

The foregoing description of the invention is explanatory only, and changes in the details of the construction and the method illustrated may be made by those skilled in the art, within the scope of the appended claims, without departing from the spirit of the invention.

What I claim and desire to secure by Letters Patent is:

1. A method of making a patch from a body of rubber patch material having protective covering material adhering to one surface thereof which includes, folding a marginal portion of the protective covering material, and severing a patch shape from the body of patch material and protective covering material with a portion of the folded protective covering material within the marginal edges of the severed patch.

2. A method of making a vulcanizing patch from a body of gum vulcanizing material having protective covering material adhering to one surface thereof which includes, folding a marginal portion of the protective covering material, and severing a patch shape from the body of vulcanizing material and protective covering material with the folded portion of the protective covering material within the marginal edges of the severed patch.

3. The method of making a vulcanizing patch from a body of vulcanizing material having a protective covering material adhering to one surface thereof which includes, folding a marginal portion of the protective covering material inwardly over the main portion thereof, severing a patch shape from the body of vulcanizing material and protective covering material with the folded protective covering material within the marginal edges of the patch shape, and unfolding the protective covering material to completely recover and project beyond the edges of such vulcanizing material.

4. The method of making vulcanizing patches from a body of gum vulcanizing material having a layer of protective covering material adhering to one surface thereof which includes, feeding an elongate strip of vulcanizing material with the protecting material adhering thereto, folding a marginal portion of the protective covering material inwardly over the main portion of such protective covering material, severing a patch shape from the body of vulcanizing material and protective covering material of a size smaller than the width of the strip of such material and with the fold of the protective covering material within and adjacent an edge of the patch shape.

5. A method of making vulcanizing patches from a body of gum vulcanizing material having a protective covering material adhering to one surface thereof which includes, feeding an elongate strip of the gum vulcanizing material with the protective covering material adhering thereto, continuously infolding a marginal portion of the protective covering material, cutting successive patch shapes from the vulcanizing material and covering material of a dimension smaller than the width of the strip of the same and with the fold of the protective covering material within and adjacent an edge of each patch shape, and unfolding the infolded protective covering material to provide a tab of such material completely covering the vulcanizing material and projecting beyond the marginal edge thereof.

6. The method of making vulcanizing patches which includes, folding a body of protective covering material upon itself to provide a multiple ply portion, applying said protective covering material to a body of gum vulcanizing material, and cutting a patch shape from the gum vulcanizing material and protective covering material with a portion of the folded portion of the protective covering material adjacent a marginal edge of the patch.

7. The method of making a patch from a body of rubber patch material having a fabricated protective covering material adhering to one surface thereof which includes, separating a portion of the protective covering material from the patch material, and cutting a patch shape from the patch material and the protective covering material with a portion of the seperated portion of protective covering material within the cutout shape.

8. The method of making a patch from a body of rubber patch material having a fabricated covering material adhering to one surface thereof which includes, separating a portion of protective covering material from the patch material, cutting a patch shape from the patch material and protective covering material with a portion of the separated portion of protective covering material within the cutout shape, and readhering the separated portion of protecting covering material to the cutout shape of patch material.

9. The method of making a patch from a body of rubber patch material having fabricated protective covering material adhering to one surface thereof which includes, separating a marginal portion of the covering material from the body of patch material, folding said separated portion of the covering material to overlie the portion of said covering material adhering to the patch material adjacent the fold, and severing a patch shape from the body of patch material and protective covering material with the folded edge of the protective covering material within and adjacent a marginal edge of the severed patch.

10. The method of making a patch from a body of rubber patch material having a fabricated protective covering material adhering to one surface thereof which includes, separating a marginal portion of the protective covering material from the patch material, folding said separated marginal portion of the protective covering material to overlie the portion of the protective covering material adhering to the patch material adjacent the fold, severing a patch shape from the body of patch material and protective covering material with the fold edge of the folded protective covering material adjacent a marginal edge of and within the severed patch shape, and then unfolding said folded marginal portion of the protective covering material and readhering the same to the patch material.

MARION H. ROWE.

REFERENCES CITED

The following references are of record in the file of this patent:

UNITED STATES PATENTS

| Number | Name | Date |
|---|---|---|
| 1,612,267 | Dickson | Dec. 28, 1926 |
| 1,650,266 | Dexter | Nov. 22, 1927 |
| 1,827,636 | Ames | Oct. 13, 1931 |
| 1,900,450 | Labine | March 7, 1933 |
| 1,930,174 | Maclennan | Oct. 10, 1933 |
| 1,960,137 | Brown | May 22, 1934 |
| 1,974,203 | Collins | Sept. 18, 1934 |

FOREIGN PATENTS

| Number | Country | Date |
|---|---|---|
| 26,706 | Great Britain | Nov. 17, 1910 |
| 34,003 | France | 1928 |
| 634,317 | France | 1928 |
| 679,341 | France | Apr. 11, 1930 |